(12) United States Patent
Shen et al.

(10) Patent No.: US 11,900,648 B2
(45) Date of Patent: Feb. 13, 2024

(54) IMAGE GENERATION METHOD, ELECTRONIC DEVICE, AND STORAGE MEDIUM

(71) Applicants: SENSETIME GROUP LIMITED, Hong Kong (CN); HONDA MOTOR CO. LTD., Tokyo (JP)

(72) Inventors: Zhiqiang Shen, Hong Kong (CN); Mingyang Huang, Hong Kong (CN); Jianping Shi, Hong Kong (CN); Hideki Matsunaga, Tokyo (JP)

(73) Assignees: SENSETIME GROUP LIMITED, Hong Kong (CN); HONDA MOTOR CO. LTD., Tokyo (JP)

( * ) Notice: Subject to any disclaimer, the term of this patent is extended or adjusted under 35 U.S.C. 154(b) by 339 days.

(21) Appl. No.: 17/452,388

(22) Filed: Oct. 26, 2021

(65) Prior Publication Data
US 2022/0044054 A1    Feb. 10, 2022

Related U.S. Application Data

(63) Continuation of application No. PCT/CN2020/076470, filed on Feb. 24, 2020.

(30) Foreign Application Priority Data

Apr. 29, 2019   (CN) .......................... 201910352792.1

(51) Int. Cl.
*G06V 10/50*    (2022.01)
*G06V 20/64*    (2022.01)
(Continued)

(52) U.S. Cl.
CPC ............ *G06V 10/50* (2022.01); *G06F 18/253* (2023.01); *G06V 10/44* (2022.01); *G06V 20/64* (2022.01)

(58) Field of Classification Search
CPC ........ G06V 10/50; G06V 20/64; G06V 10/44; G06F 18/253
See application file for complete search history.

(56) References Cited

U.S. PATENT DOCUMENTS

2018/0240257 A1* 8/2018 Li .......................... G06V 10/774
2018/0357800 A1   12/2018 Oxholm et al.
2019/0057356 A1   2/2019 Larsen et al.

FOREIGN PATENT DOCUMENTS

CN    106327539 A    1/2017
CN    108734653 A    11/2018
(Continued)

OTHER PUBLICATIONS

Lee, H. Y., Tseng, H. Y., Huang, J. B., Singh, M., & Yang, M. H. (2018). Diverse image-to-image translation via disentangled representations. In Proceedings of the European conference on computer vision (ECCV) (pp. 35-51). (Year: 2018).*
(Continued)

*Primary Examiner* — David Perlman
(74) *Attorney, Agent, or Firm* — Syncoda LLC; Feng Ma

(57) ABSTRACT

An image generation method includes: extracting a content feature of a first image; respectively extracting an overall image style feature of a second image, and an object style feature of a partial image block, which includes an object, in the second image; determining a target style feature at least according to the overall image style feature and the object style feature; and generating a third image according to the content feature and the target style feature.

20 Claims, 8 Drawing Sheets

(51) Int. Cl.
*G06V 10/44* (2022.01)
*G06F 18/25* (2023.01)

(56) References Cited

FOREIGN PATENT DOCUMENTS

| | | |
|---|---|---|
| CN | 108805803 A | 11/2018 |
| JP | 2018132855 A | 8/2018 |

OTHER PUBLICATIONS

Wang, Z., Zhao, L., Xing, W., & Lu, D. (2018). Glstylenet: Higher quality style transfer combining global and local pyramid features. arXiv preprint arXiv: 1811.07260. (Year: 2018).*

Dmitry Ulyanov, et al. "Texture Networks: Feed-forward Synthesis of Textures and Stylized Images", arXiv, Mar. 10, 2016.

Chuan Li, et al. "Precomputed Real-Time Texture Synthesis with Markovian Generative Adversarial Networks", arXiv, Apr. 15, 2016.

Leon A. Gatys, et al., "Image Style Transfer Using Convolutional Neural Networks", 2016 IEEE Conference on Computer Vision and Pattern Recognition, IEEE, Jun. 30, 2016, 2414-2423.

Hidemoto Nakada and Hideki Asoh, "A Style Transfer Method using Variational Autoencoder", Technology Research Report, Electronic Information and Communication Society, Japan, The Dankai Kai Society, 2018, No. 117, 121-126.

First Office Action of the Japanese application No. 2021-564168, dated Oct. 25, 2022.

Zhiqiang Shen, et al. "Towards Instance-level Image-to-Image Translation", 2019 IEEE/CVF Conference on Computer Vision and Pattern Recognition (CVPR).

Lin, Xing et al. "Enhanced Image Style Transferring Method with Primary Structure Maintained", Pattern Recognition and Artificial Intelligence, vol. 31, No. 11, Nov. 15, 2018 (Nov. 15, 2018).

International Search Report in the international application No. PCT/CN2020/076470, dated May 28, 2020.

English translation of the Written Opinion of the International Search Authority in the international application No. PCT CN2020/076470, dated May 28, 2020.

* cited by examiner

US 11,900,648 B2

IMAGE GENERATION METHOD, ELECTRONIC DEVICE, AND STORAGE MEDIUM

CROSS-REFERENCE TO RELATED APPLICATIONS

This is a continuation of International Application No. PCT/CN2020/076470 filed on Feb. 24, 2020, which claims priority to Chinese Patent Application No. 201910352792.1 filed on Apr. 29, 2019. The disclosures of the above-referenced applications are hereby incorporated by reference in their entirety.

BACKGROUND

In related technologies, the overall transformation of an image style can be realized in the manners of deep learning, etc. For example, the brightness, contrast, lighting, color, artistic characteristics, art works, or the like in an image can be transformed to obtain images with different styles. However, the style transformation can only act on an overall image, and the style of a target object in the image can only be transformed together with the overall style of the image, which can not reflect the style of the target object, causing the problems that a transformed image is monotonous in style, the overall image is inharmonious with an area where the target object is located, etc.

SUMMARY

Embodiments of the disclosure relate to the technical field of computer technologies and provide an image generation method and apparatus, an electronic device, and a storage medium.

In a first aspect, the embodiments of the disclosure provide an image generation method, which may include the following operations.

A content feature of a first image is extracted.

An overall image style feature of a second image and an object style feature of a local image block, including an object, in the second image are respectively extracted. A style of the second image is different from that of the first image.

A target style feature is determined at least according to the overall image style feature and the object style feature.

A third image is generated according to the content feature and the target style feature, so that the third image has a content corresponding to the content feature and a style corresponding to the target style feature.

In a second aspect, the embodiments of the disclosure provide an image generation apparatus, which includes a first extraction module, a second extraction module, a determination module, and a first generation module.

The first extraction module is configured to extract a content feature of a first image.

The second extraction module is configured to extract an overall image style feature of a second image and an object style feature of a local image block, including an object, in the second image respectively. A style of the second image is different from that of the first image.

The determination module is configured to determine a target style feature according to at least the overall image style feature and the object style feature.

The first generation module is configured to generate a third image according to the content feature and the target style feature, so that the third image has a content corresponding to the content feature and a style corresponding to the target style feature.

In a third aspect, the embodiments of the disclosure provide an electronic device, which includes:

a processor, and a memory, configured to store a processor executable instruction.

The processor is configured to execute the above-mentioned image generation method of the embodiments of the disclosure.

In a fourth aspect, the embodiments of the disclosure provide a computer readable storage medium having a computer program instruction stored thereon. The computer program instruction, when being executed, implements the above-mentioned image generation method of the embodiments of the disclosure.

It is to be understood that the above general description and the following detailed description are only intended to be illustrative and not restrictive, instead of limiting the disclosure.

Other features and aspects of the embodiments of the disclosure will become apparent from the following detailed description of exemplary embodiments with reference to the accompanying drawings.

BRIEF DESCRIPTION OF THE DRAWINGS

The accompanying drawings here are incorporated in the specification as a part of the specification. These accompanying drawings show embodiments that are in accordance with the disclosure, and used together with the specification to describe technical solutions of the embodiments of the disclosure.

DETAILED DESCRIPTION

Figure 1:
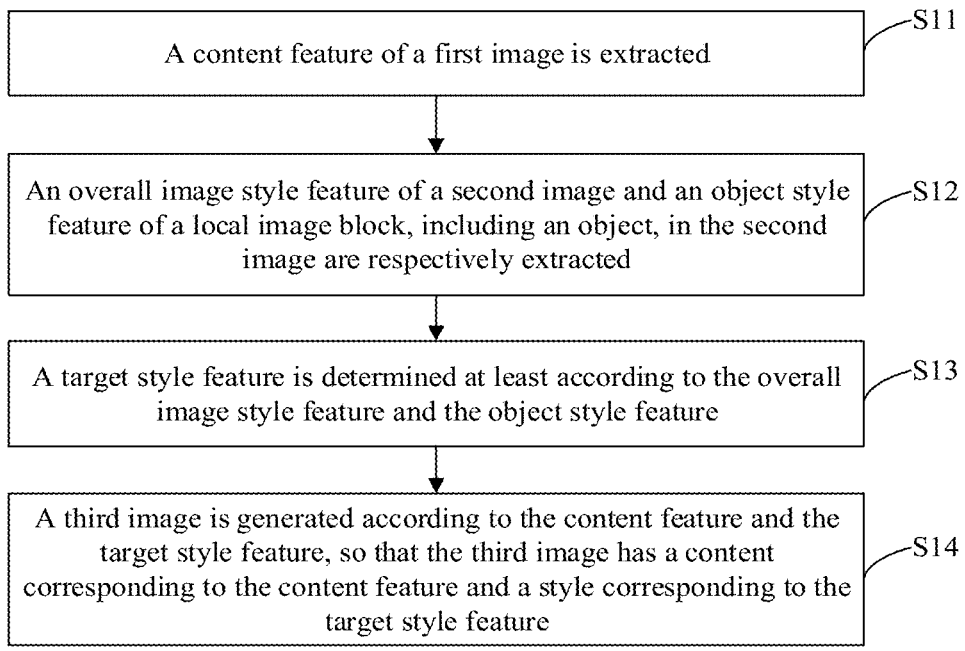
FIG. 1 shows a first flowchart of an image generation method according to some embodiments of the disclosure.

Each exemplary embodiment, feature and aspect of the disclosure will be described below with reference to the drawings in detail. The same reference signs in the drawings represent components with the same or similar functions. Although various aspects of the embodiments are shown in the drawings, the drawings are not required to be drawn to scale, unless otherwise specified.

Herein, special term "exemplary" refers to "use as an example, embodiment or description". Herein, any "exemplarily" described embodiment may not be explained to be superior to or better than other embodiments.

The term "and/or" in this specification describes only an association relationship for describing associated objects and represents that three relationships may exist. For example, A and/or B may represent the following three cases: Only A exists, both A and B exist, and only B exists. In addition, term "at least one" in the disclosure represents any one of multiple or any combination of at least two of multiple. For example, including at least one of A, B and C may represent including any one or more elements selected from a set formed by A, B and C.

In addition, for describing the disclosure better, many specific details are presented in the following specific implementation modes. It is understood by those skilled in the art that the disclosure may still be implemented even without some specific details. In some examples, methods, means, components and circuits known very well to those skilled in the art are not described in detail, to highlight the subject of the disclosure.

FIG. 1 shows a first flowchart of an image generation method according to the embodiments of the disclosure. As shown in FIG. 1, the method includes the following operations.

At S11, a content feature of a first image is extracted.

At S12, an overall image style feature of a second image and an object style feature of a local image block, including an object, in the second image are respectively extracted. A style of the second image is different from that of the first image.

At S13, a target style feature is determined at least according to the overall image style feature and the object style feature.

At S14, a third image is generated according to the content feature and the target style feature, so that the third image has a content corresponding to the content feature and a style corresponding to the target style feature.

According to the image generation method of the embodiments of the disclosure, a target style feature, which is determined by an overall image style feature and an object style feature of a second image, and a content feature of a first image may be used to obtain a third image with a content corresponding to the content feature and a style corresponding to the target style feature. When a style of an image is transformed, not only an overall image style of the image is transformed, but also the style of a local image block, where the object is located, of the image may also be transformed properly, so that the overall image of the image coordinates with the region where the object is located, which improves the fidelity of a style migrated image, and can improve the detection accuracy of the object in the image. Further, the generated third image has the content corresponding to the content feature of the first image and the style corresponding to the target style feature, which expands the richness of image samples with the content corresponding to the content feature of the first image, and especially greatly reduces the cost of manual collection and annotation for difficult image samples or a few image samples.

In a possible implementation manner, the method may be executed by a terminal device. The terminal device may be User Equipment (UE), a mobile device, a user terminal, a terminal, a cell phone, a cordless phone, a Personal Digital Assistant (PDA), a handheld device, a computing device, a vehicle device, a wearable device, etc. The method may be implemented by the processor by calling a computer readable instruction stored in a memory. Or, the method is executed by a server.

In a possible implementation manner, both the first image and the second image may be an image including one or more objects. The objects may be objects with different categories. The first image and/or the second image includes an object with at least one of the following categories: motor vehicles, non-motor vehicles, persons, traffic signs, traffic lights, trees, animals, buildings, or obstacles.

In a possible implementation manner, the image style of the first image is different from the image style of the second image. The image style may include the brightness, contrast, lighting, color, artistic characteristics, art works, or the like in an image. In an example, the first image and the second image may be photographed in different environments, for example, images photographed in the environments of day, night, rain, fog, etc. For example, the first image is an image photographed at a certain place during the day, and the second image is an image photographed at the other place during the night.

In a possible implementation manner, at S11, the content feature of the first image may be extracted. The content feature may be used to represent the content included in the first image. As an example, the content feature may be at least one of the category information, shape information, position information, etc., of the object in the first image, or the content feature may also include a background of the first image, etc. As another example, the content feature may include the content feature of an overall image of the first image. In an example, the content feature of the first image may be extracted through a feature extractor. In actual application, the feature extractor may be implemented through a Convolutional Neural Network (CNN), etc. The embodiments of disclosure do not limit the implementation manner of the feature extractor. The content feature may include a feature map or a feature vector of the first image acquired by the feature extractor.

In a possible implementation manner, the content feature of the first image may include an object content feature of a local image block, including an object, of the first image. A plurality of local image blocks may be extracted from the first image. Each local image block may include one object, and the object content feature of each local image block is extracted. For example, the object content feature of each local image block of the first image may be extracted through a feature extractor.

In a possible implementation manner, at S12, an overall image style feature of a second image and an object style feature of a local image block, including an object, in the second image may be extracted through the feature extractor. Exemplarily, the feature extractor may be implemented through a CNN, etc. The embodiments of disclosure do not limit the implementation manner of the feature extractor. For example, the feature extractor may perform extracting processing on the second image and the local image block of the second image respectively to obtain the overall image style feature and an object style feature of each object respectively. The overall image style feature and the object style feature may be a feature vector with the length of 8 bits. The embodiments of disclosure do not limit the expression manners of the overall image style feature and the object style feature.

In a possible implementation manner, when the second image includes a plurality of objects, the operation that an object style feature of a local image block, including an object, in the second image is extracted includes that: a plurality of local image blocks are extracted from the second image, each local image block includes one object, and the object style feature of each of the local image blocks are respectively extracted.

In an example, local image blocks, each including one object, in the second image are extracted from the second image respectively, and the object style feature of each local image block is extracted by using the feature extractor. Further, when the plurality of objects belong to a plurality of categories, the operation that an object style feature of a local image block, including an object, in the second image further includes that: the object style features extracted from a plurality of local image blocks with the same category object are fused. For example, processes, such as residual connection, may be performed on the object style features of a plurality of objects with the same category, so as to fuse the plurality of object style features of the objects with the same category. In an example, the overall image style feature and the object style feature of the first image may be extracted in the same manner.

In an example, if the first image is an image photographed at a certain place during the day, and the second image is an image photographed at the other place during the night, the overall image style feature and the object style feature of the first image may express the style of the image photographed during the day, for example, all of the brightness, contrast, lighting, and color of the image are the styles of the image photographed during the day. The overall image style feature of the first image expresses the information of the style of the first image, and the object style feature of the first image expresses the information of the style of the area (i.e., a local image block of the first image), where the object is located, in the first image. The overall image style feature and the object style feature of the second image may express the style of the image photographed during the night. The overall image style feature of the second image expresses the information of the style of the second image, and the object style feature of the second image expresses the information of the style of the area (i.e., a local image block of the second image), where the object is located, in the second image.

In a possible implementation manner, at S13, the target style feature is determined according to at least the overall image style feature and the object style feature of the second image. The style of the second image is different from that of the first image. The target style feature may be determined according to the overall image style feature and the object style feature of the second image. The style of the first image is changed to obtain an image with a style, corresponding to the target style feature, and the content of the first image, i.e., the third image. The third image may include an overall image of the first image with a transformed style (i.e., the image with the content corresponding to the content feature of the overall image of the first image and the style corresponding to the target style feature), and a local image block with a transformed style (i.e., the image with the content corresponding to the object content feature of the local image block in the first image and the style corresponding to the target style feature).

In a possible implementation manner, S13 may include that: the overall image style feature is fused into the object style feature to obtain the target style feature. In an example, both the overall image style feature and the object style feature of the second image are feature vectors. Processes, such as residual connection, may be performed on the overall image style feature and the object style feature, so as to fuse the overall image style feature to the object style feature to obtain the target style feature.

In this manner, the overall image style feature may be fused into the object style feature to obtain the target style feature. In a process of generating a third image by the target style feature, the third image has the style corresponding to the overall image style feature, and the object in the third image has the style corresponding to the object style feature and coordinates with the style corresponding to the overall image style feature, which improves the fidelity of a style migrated image. Compared with fusing the object style feature to the overall image style feature, the coordination, between the style of the object and the style of the overall image of the third image, achieved in a manner of fusing the overall image style feature to the object style feature is better.

Figure 2:
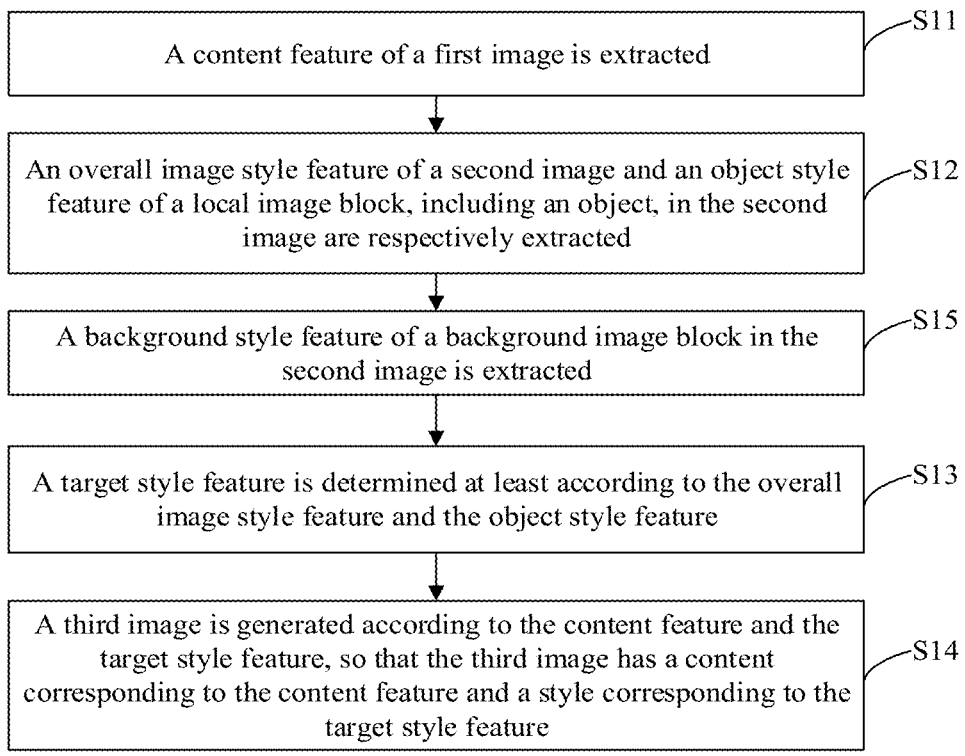
FIG. 2 shows a second flowchart of an image generation method according to some embodiments of the disclosure.

Based on the previously described embodiments, FIG. 2 shows a second flowchart of an image generation method according to the embodiments of the disclosure. As shown in FIG. 2, the method further includes the following operations.

At S15, a background style feature of a background image block in the second image is extracted. The background image block is an image block other than the local image block in the second image.

In an example, the background style feature of the background image block in the second image may be extracted by the feature extractor.

S13 in the previously described embodiments may include that: the target style feature may be determined according to the overall image style feature, the object style feature, and the background style feature.

In this manner, the target style feature may be determined according to the overall image style feature, the object style feature, and the background style feature, so that the third image has the style corresponding to the overall image style feature, the background of the third image has the style corresponding to the background style feature, and the object in the third image has the style corresponding to the object style feature.

In a possible implementation manner, the operation that the target style feature is determined according to the overall image style feature, the object style feature, and the background style feature includes the following operations. The overall image style feature is fused into the background style feature. The background style feature into which the overall image style feature has been fused is fused into the object style feature to obtain the target style feature.

In the embodiment, the target style feature may be obtained by fusing the overall image style feature of the second image into the background style feature of the second image, and then fusing the background style feature into which the overall image style feature of the second image has been fused into the object style feature of the second image. In other implementations, the target style feature may be obtained by fusing the overall image style feature of the second image into the object style feature of the second image.

Figure 3:
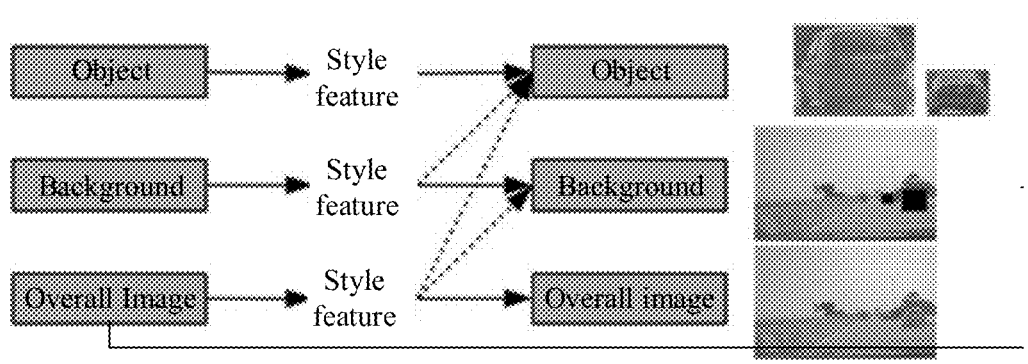
FIG. 3 shows a schematic diagram of fusion of style features according to some embodiments of the disclosure.

Exemplarily, FIG. 3 shows a schematic diagram of fusion of style features according to the embodiments of the disclosure. As shown in FIG. 3, the overall image style feature, the background style feature, and the object style feature of the second image are all feature vectors. Processes, such as residual connection, may be performed on the overall image style feature and the background style feature, so as to fuse the overall image style feature into the background style feature, and processes, such as residual connection, may be performed on the background style feature into which the overall image style feature has been fused and the object style feature, so as to fuse the background style feature into which the overall image style feature has been fused into the object style feature to obtain the target style feature.

In this manner, the overall image style feature may be fused into the background style feature and then fused into the object style feature to obtain the target style feature. In a process of generating a third image based on the target style feature, the third image has the style corresponding to the overall image style feature, the background in the third image has the style corresponding to the background style feature and coordinates with the style corresponding to the overall image style feature, so that the object in the third image has the style corresponding to the object style feature and coordinates with the style corresponding to the overall image style feature and the style corresponding to the background style feature, which improves the fidelity of a style migrated image. Compared with fusing the object style feature into the background style feature and then fusing into the overall image style feature, the coordination, among the style of the object, the style of the background, and the style of the overall image of the third image, achieved in a manner of fusing the overall image style feature into the background style feature and then fusing into the object style feature is better.

In a possible implementation manner, at S14, a third image which has the content corresponding to the content feature of the first image and the style corresponding to the target style feature may be generated according to the content feature of the first image and the target style feature. For example, the third image may be generated by an image generator according to the content feature of the first image and the target style feature.

In the embodiment, the content feature of the first image may include the content feature of the overall image of the first image and the object content feature of each local image block in the first image. In a possible implementation manner, residual connection may be performed on the content feature of the overall image of the first image and the target style feature, and/or residual connection may be performed on the object content feature of each local image block in the first image and the target style feature. For example, the residual connection may be performed by the methods, such as Adaptive Instance Normalization (AdaIN) to obtain feature information including the content feature of the overall image of the first image and the target style feature, and/or the feature information including the object content feature of each local image block in the first image and the target style feature.

In a possible implementation manner, decoding processing may be performed on the feature information (the feature information may include: the content feature of the overall image of the first image and the target style feature, and/or the object content feature of each local image block of the first image and the target style feature) through the image generator, so as to generate an image with the content corresponding to the content feature of the overall image of the first image and the style corresponding to the target style feature, and/or generate a local image block with the content corresponding to the object content feature of each local image block in the first image and the style corresponding to the target style feature.

In a possible implementation manner, the image with the content corresponding to the content feature of the overall image of the first image and the style corresponding to the target style feature, and/or the local image block with the content corresponding to the object content feature of each local image block in the first image and the style corresponding to the target style feature may be input into the image generator to obtain the image with the content corresponding to the content feature of the overall image of the first image and the style corresponding to the target style feature, and/or the local image block with the content corresponding to the object content feature of each local image block in the first image and the style corresponding to the target style feature. Both the above-mentioned image and local image block may be called a third image.

Figure 4:
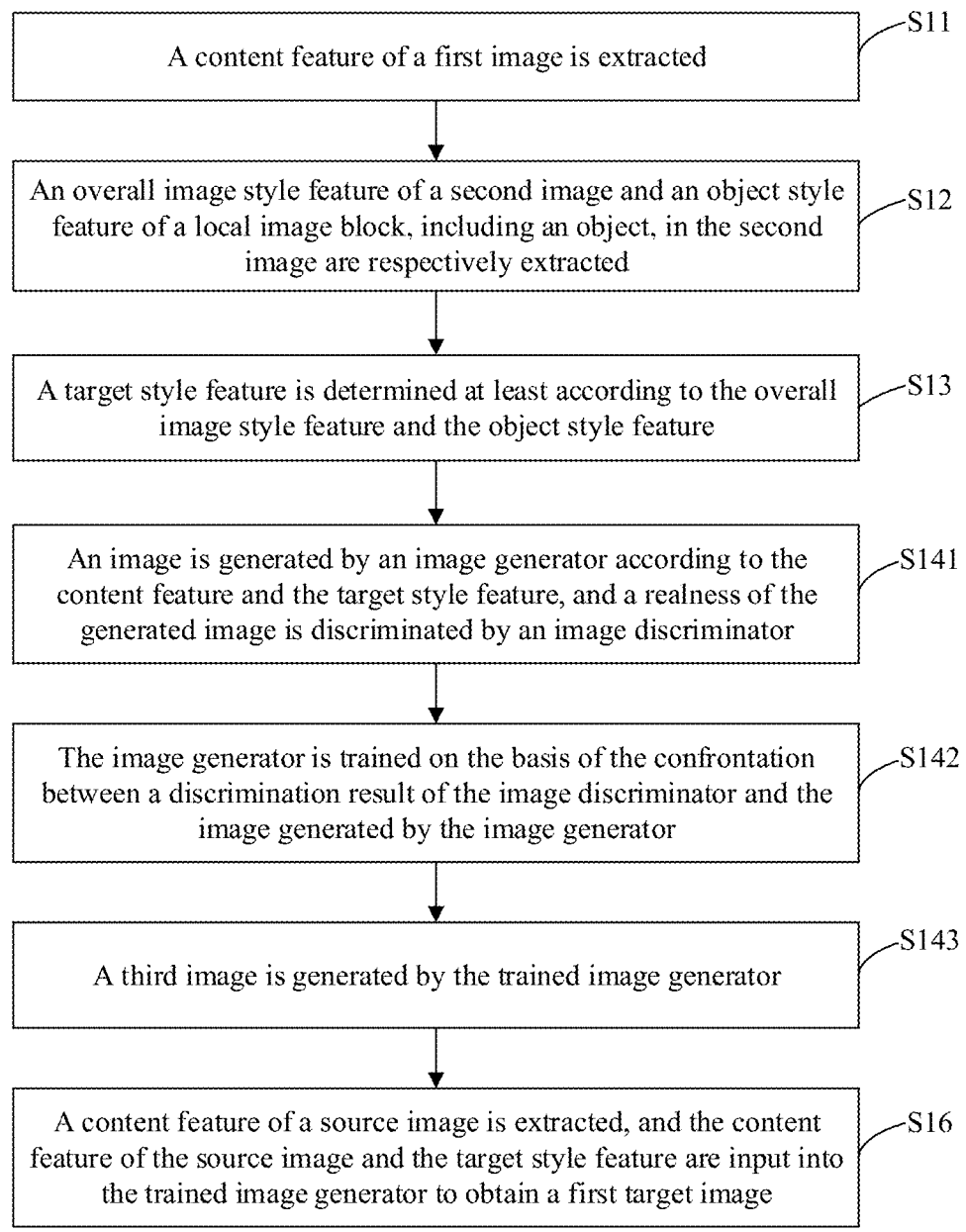
FIG. 4 shows a third flowchart of an image generation method according to some embodiments of the disclosure.

In a possible implementation manner, as shown in FIG. 4, S14 may include the following operations.

S141, an image is generated by the image generator according to the content feature and the target style feature, and the realness of the generated image is discriminated by an image discriminator.

S142, the image generator is trained on the basis of the confrontation between a discrimination result of the image discriminator and the image generated by the image generator.

S143, the trained image generator generates a third image.

In the embodiment, the content feature of the generated image is consistent with the content feature of the first image, the content feature of the local image block in the generated image is consistent with the content feature of the local image block in the first image, and the style of the generated image is consistent with the target style feature. However, the generated image is the image generated by the image generator. There may be a difference between the content of the generated image and the first image or a local image block of the first image, and there may also be a difference between the style of the generated image and the target style feature. A network loss may be determined according to the deviation, and the image generator and the feature extractor are trained on the basis of the network loss.

In a possible implementation manner, the generated image may be input into the image discriminator. The realness of the generated image is discriminated by the image discriminator. The image generator is trained on the basis of the confrontation between the discrimination result of the image discriminator and the image generated by the image generator.

In a possible implementation manner, a first comprehensive network loss is determined according to the difference between the generated image and the first image. For example, a cross entropy loss may be determined according to the difference between corresponding pixel points in the generated image and the first image. The cross entropy loss is taken as the first comprehensive network loss.

In another possible implementation manner, if the generated image is a local image block, then a second comprehensive network loss may be determined according to the difference between the generated local image block and the local image block of the first image. For example, a cross entropy loss may be determined according to the difference between corresponding pixel points in the generated local image block and the local image block of the first image. The cross entropy loss is taken as the second comprehensive network loss.

In a possible implementation manner, both the first comprehensive network loss and the second comprehensive network loss may be expressed by Formula (1) below.

$$L_r = \|\hat{k} - k\|_1 \quad (1)$$

$L_r$ expresses the first comprehensive network loss or the second comprehensive network loss, $\hat{k}$ expresses a pixel point of the generated image or a pixel point of the generated local image block, k expresses a pixel point of the first image or a pixel point of the local image block in the first image, and $\|\hat{k} - k\|_1$ expresses 1-norm of the difference between pixel points corresponding to $\hat{k}$ and k. In addition, $\hat{k}$ may also express the content information, the style information, etc. of the generated image or the generated local image block, and k may also express the content information, the style information, etc. of the first image or the local image block of the first image.

In a possible implementation manner, the generated image or the generated local image block may be input into the image discriminator to perform discrimination processing to obtain a discrimination result. The discrimination result may include a first discrimination result corresponding to the generated image, and/or, a second discrimination result corresponding to the generated local image block. The first discrimination result and the second discrimination result may be used to respectively express the realness of the generated image and the realness of the generated local image block. In an example, the first discrimination result and the second discrimination result may be in the form of probability. For example, the discrimination result expresses the probability that the generated image is a real image is 80%.

In a possible implementation manner, adversarial training may be performed on the feature extractor, the image generator, and the image discriminator according to at least one of the above-mentioned first comprehensive network loss or second comprehensive network loss, and at least one of the above-mentioned first discrimination result or second discrimination result. That is, network parameters of the feature extractor, the image generator, and the image discriminator are adjusted until the a first training condition and a second training condition reach a balanced state. The first training condition, for example, is that: the first comprehensive network losses of the feature extractor and the image generator and/or the second comprehensive network losses of the feature extractor and the image generator are minimized or are less than a preset first threshold. The second training condition, for example, is that: the probability that the first discrimination result and/or the second discrimination result output by the image discriminator is a real image is maximized or is greater than a preset second threshold.

In a possible implementation manner, the first image and the second image are two images with different styles, so the positions of the two images may be exchanged to train the feature extractor, the image generator, and the image discriminator during training. For example, during one training, the first image is an image A, and the second image is an image B, and during the other training, the first image is an image B, and the second image is an image A, these two trainings may be taken as a training group, and the network losses in the two trainings are determined as a comprehensive network loss of the feature extractor, the image generator, and the image discriminator, or an average value of the network losses in the two trainings is determined as a comprehensive network loss of the feature extractor, the image generator, and the image discriminator.

Based on the above-mentioned example, in a possible implementation manner, the comprehensive network loss may be expressed by Formula (2) below.

$$L = (L_{adv}^1 + L_{adv}^2) + (L_{adv}^3 + L_{adv}^4) + \lambda_1(L_r^1 + L_r^2) + \lambda_2(L_r^3 + L_r^4) + \lambda_3(L_r^5 + L_r^6) + \lambda_4(L_r^7 + L_r^8) + \lambda_5(L_r^9 + L_r^{10}) + \lambda_6(L_r^{11} + L_r^{12}) \quad (2)$$

$L_{adv}^1$ is adversarial loss of the first discrimination result determined in one training. $L_{adv}^2$ is adversarial loss of the first discrimination result determined in the other training. $L_{adv}^3$ is adversarial loss of the second discrimination result determined in one training. $L_{adv}^4$ is adversarial loss of the second discrimination result determined in the other training. $L_r^1$ is the first comprehensive network loss determined in one training when k expresses a pixel point of the first image and $\hat{k}$ expresses a pixel point of the generated image. $L_r^2$ is the first comprehensive network loss determined in the other training when k expresses a pixel point of the first image and $\hat{k}$ expresses a pixel point of the generated image. $L_r^3$ is the first comprehensive network loss determined in one training when k expresses content information of the first image and $\hat{k}$ expresses content information of the generated image. $L_r^4$ is the first comprehensive network loss determined in the other training when k expresses the content information of the first image and $\hat{k}$ expresses the content information of the generated image. $L_r^5$ is the first comprehensive network loss determined in one training when k expresses style information of the first image and $\hat{k}$ expresses style information of the generated image. $L_r^6$ is the first comprehensive network loss determined in the other training when k expresses style information of the first image and $\hat{k}$ expresses style information of the generated image. $L_r^7$ is the second comprehensive network loss determined in one training when k expresses a pixel point of a local image block in the first image and $\hat{k}$ expresses a pixel point of the generated local image block. $L_r^8$ is the second comprehensive network loss determined in the other training when k expresses the pixel point of the local image block in the first image and $\hat{k}$ expresses the pixel point of the generated local image block. $L_r^9$ is the second comprehensive network loss determined in one training when k expresses content information of the local image block in the first image and $\hat{k}$ expresses the content information of the generated local image block. $L_r^{10}$ is the second comprehensive network loss determined in the other training when k expresses the content information of the local image block in the first image and $\hat{k}$ expresses the content information of the generated local image block. $L_r^{11}$ is the second comprehensive network loss determined in one training when k expresses style information of the local image block in the first image and $\hat{k}$ expresses the style information of the generated local image block. $L_r^{12}$ is the second comprehensive network loss determined in the other training when k expresses the style information of the local image block in the first image and $\hat{k}$ expresses the style information of the generated local image block.

In a possible implementation manner, adversarial training may be performed on the feature extractor, the image generator, and the image discriminator according to the comprehensive network loss determined by the above-mentioned Formula (2). The training may be ended until the first training condition and the second training condition reach a balanced state, so as to obtain a trained image generator and a feature extractor.

In a possible implementation manner, the third image may be generated through the trained image generator. For example, the image generator may perform decoding processing on the content feature of the first image (for example, the content feature of the overall image of the first image or the object content feature of each local image block in the first image) and the target style feature through the decoding processing, such as upsampling, so as to generate the third image. The generated third image may have the content corresponding to the content feature of the first image and the style corresponding to the target style feature. In an example, if the first image includes annotation of each object in the image (for example, category annotation, etc.), since the generated third image has the content corresponding to the content characteristics of the first image, the third image may have the annotation of each object in the image.

In a possible implementation manner, the feature extractor and the image generator may be trained using two consistent images, which can improve the training efficiency and improve the training effect. The two consistent images indicate that the above-mentioned first image and second image are the images with consistent content.

When the first image and the second image are the images with consistent content, the second image may be an image obtained by performing scaling processing on the first image, i.e., the second image has consistent content and consistent style, but inconsistent resolution with the first image. The feature extractor and the image generator may be trained by the first image and the second image, which can improve the universality of the feature extractor and the image generator to the resolution, and improve the robustness of the feature extractor and the image generator.

According to the image generation method of the embodiments of the disclosure, in one aspect, the feature extractor and the image generator may be trained by generating an image consistent with the first image or the local image block of the first image through the feature extractor and the image generator, which can improve the training efficiency and the training effect. On the other aspect, the target style feature determined by the overall image style feature and the object style feature of the second image and the content feature of the first image may be used to obtain a third image with the content corresponding to the content feature and the style corresponding to the target style feature. When a style of an image is transformed, not only an overall image style of the image is transformed, but also the style of a local image block, where the object is located, in the image may also be transformed properly, so that the overall image of the image coordinates with the region where the object is located, which improves the fidelity of a style migrated image, and can improve the detection accuracy of the object in the image. Further, the generated third image has the content corresponding to the content feature of the first image and the style corresponding to the target style feature, and may also have the same annotation as the first image, which expands the richness of image samples with the content corresponding to the content feature of the first image, and especially greatly reduces the cost of manual collection and annotation for difficult image samples (for example, the images collected under a weather condition, for example, an extreme weather condition, that is difficult to encounter) or a few image samples (for example, the images collected in a certain environment in which few images are collected, for example, the images collected during night).

Based on the previously described embodiments, in a possible implementation manner, as shown in FIG. 4, the method further includes the following operations.

At S16, a content feature of a source image is extracted. The content feature of the source image and the target style feature are input into a trained image generator to obtain a first target image. The first target image has a content corresponding to the content feature of the source image and a style corresponding to the target style feature.

In the embodiment, the content feature of the source image may be extracted after the training of the feature extractor and the image generator is completed. The first target image with the content corresponding to the content feature of the first image and the target style feature is output by transforming the style of the source image in any style into a specific style through the image generator.

Figure 5:
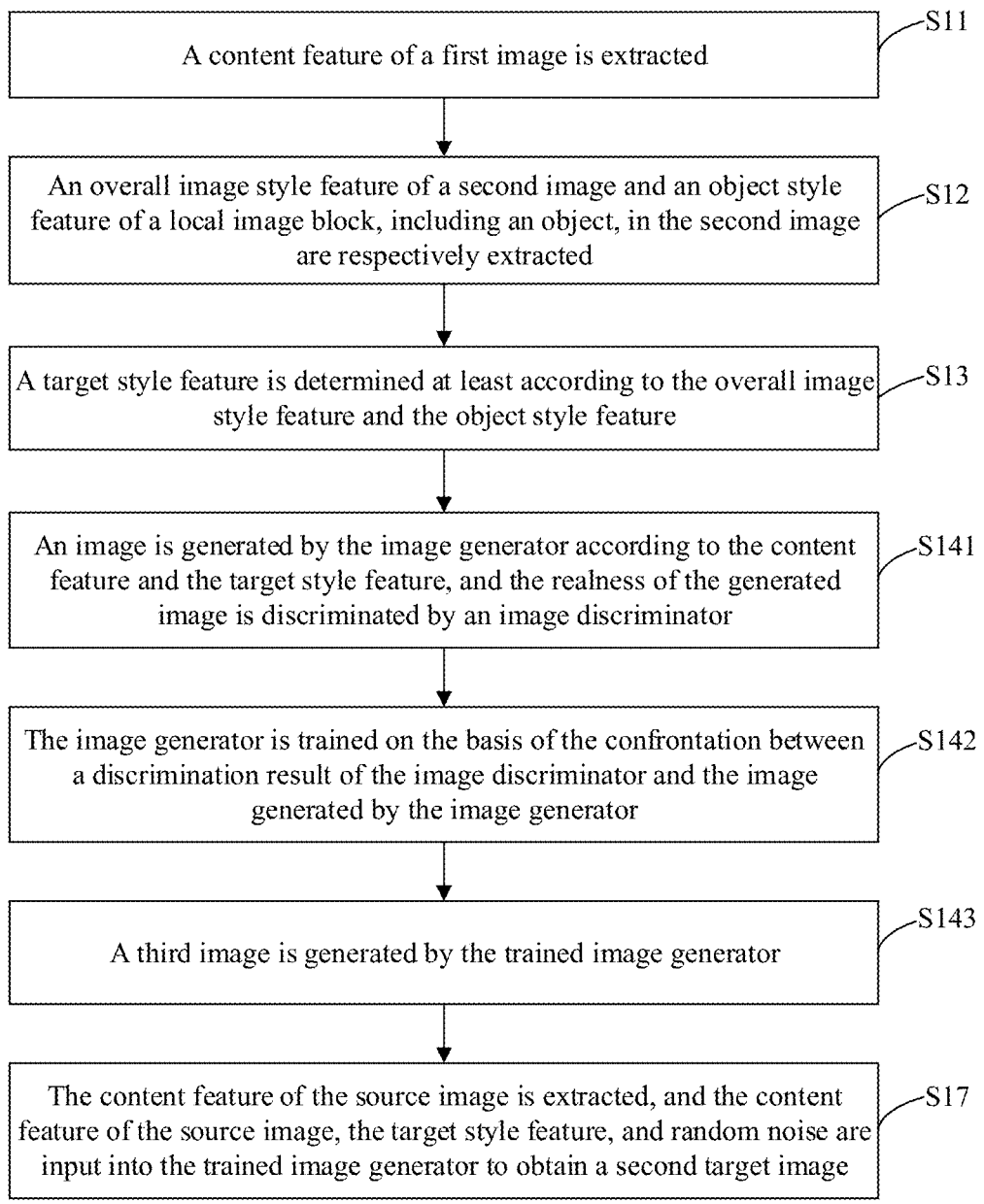
FIG. 5 shows a fourth flowchart of an image generation method according to some embodiments of the disclosure.

Based on the previously described embodiments, FIG. 5 shows a fourth flowchart of an image generation method according to the embodiments of the disclosure. As shown in FIG. 5, the method further includes the following operations.

At S17, the content feature of the source image is extracted. The content feature of the source image, the target style feature, and random noise are input into the trained image generator to obtain a second target image. The second target image has the content corresponding to the content feature of the source image and the second target image has the style corresponding to the target style feature. Or the second target image has the content corresponding to the content feature of the source image and the random noise and the second target image has the style corresponding to the target style feature.

Or the second target image has the content corresponding to the content feature of the source image and the second target image has the style corresponding to the target style feature and the random noise. Or the second target image has the content corresponding to the content feature of the source image and the random noise and the second target image has the style corresponding style corresponding to the target style feature and the random noise. Or the second target image has the content corresponding to the content feature of the source image and the second target image has the style corresponding to the style noise. Or the second target image has the content corresponding to the content feature of the source image and the random noise and the second target image has the style corresponding to the random noise.

In an example, the random noise may include random content noise and/or random style feature extracted from an image with random content or style, or the random content noise and/or random style feature of an image with a randomly generated Red Green Blue (RGB) value of each pixel point being a random value. The random content noise and/or random style feature of the above-mentioned image may be extracted by the feature extractor. The image style corresponding to the random style feature is random. For example, the source image is an image photographed at a certain place during the day, and the random noise may be a random style feature extracted from an artificially randomly generated image. For example, one of the styles of night, evening, cloudy day, dawn, rainy day, snow day, etc. may be selected as the style of random noise, and at least one of a motor vehicle, a non-motor vehicle, a person, a traffic sign, a traffic light, a tree, an animal, a building or an obstacle may be selected as the content, so as to generate an image for obtaining the random noise.

Exemplarily, the image generator may generate a second target image according to at least one of a content feature of a source image, random noise (the random noise may include a random style feature and/or a random content feature), and a target style feature. In an example, the content feature of the source image and the random content feature of the random noise may be fused to obtain a content feature corresponding to the source image and the random noise. The target style feature and the random style feature of the random noise may also be fused to obtain a style feature corresponding to the target style feature and the random noise. The image generator may generate, according to the above-mentioned features, a second target image with the content corresponding to the source image and the style corresponding to the target style feature, or a second target image with the content corresponding to the source image and the random noise and the style corresponding to the target style feature, or a second target image with the content corresponding to the source image and the style corresponding to the target style feature and the random noise, or a second target image with the content corresponding to the source image and the random noise and the style corresponding to the target style feature and the random noise, or a second target image with the content corresponding to the source image and the style corresponding to the random noise, or a second target image with the content corresponding to the source image and the random noise and the style corresponding to the random noise. Therefore, images of more than one style may be implemented on the basis of a neural network, which improves the diversity of the content and/or the style of the generated image.

By using the technical solution of the embodiment of the application, the style of an image in any style may be transformed by the feature extractor or the image generator, so that the overall of the transformed image coordinates with an area where a target object is located.

Figure 6A:
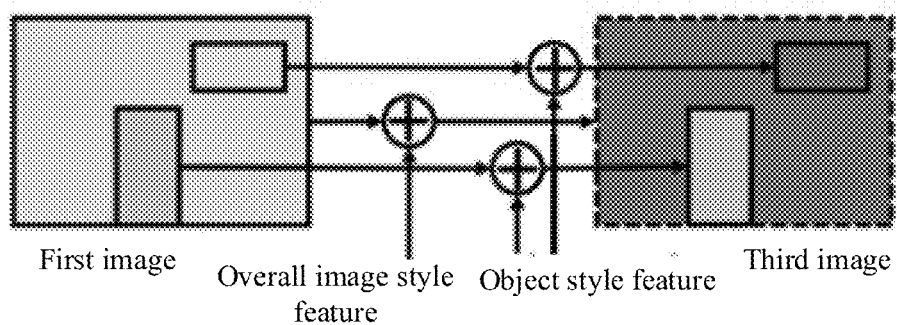
FIG. 6A is a first schematic diagram of application of the image generation method according to some embodiments of the disclosure.
Figure 6B:
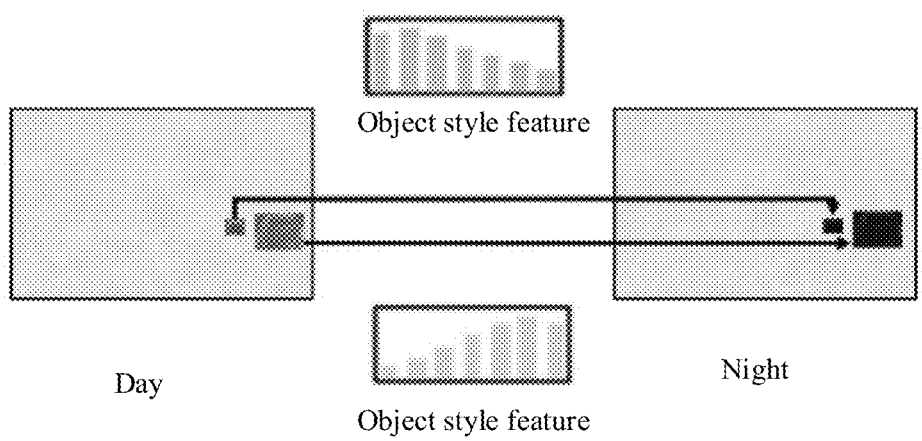
FIG. 6B is a second schematic diagram of application of the image generation method according to some embodiments of the disclosure.
Figure 6C:
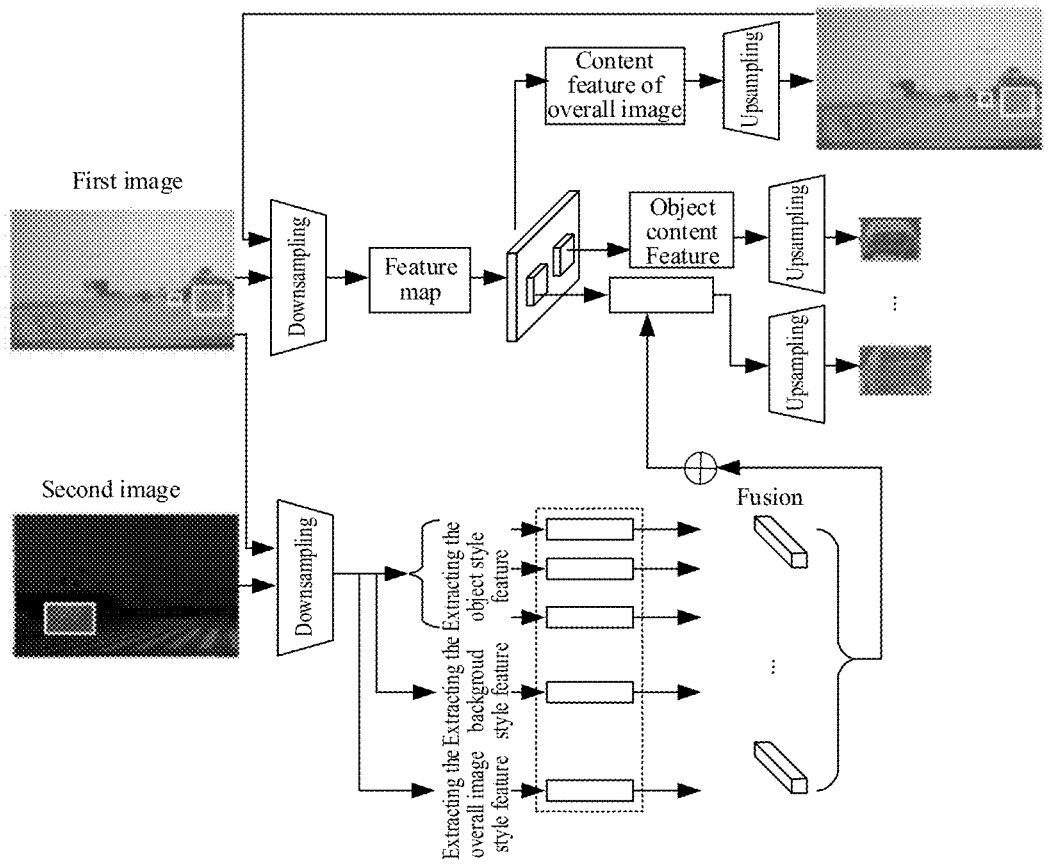
FIG. 6C is a third schematic diagram of application of the image generation method according to some embodiments of the disclosure.

FIG. 6A to 6C show schematic diagrams of application of the image generation method according to the embodiments of the disclosure. As shown in FIG. 6A, the style of the first image is different from that of the second image. For example, the first image is an image photographed at a certain place during the day, and the second image is an image photographed at the other place during the night. The styles of the overall image of the first image and a local image block including an object in the first image may be transformed respectively to obtain a third image. The third image has the same content as the first image and the style corresponding to the target style feature determined according to the overall image style feature and the object style feature. For example, as shown in FIG. 6B, the first image is an image of a certain street photographed during the day (for example, an image shown in an upper left portion of FIG. 6B). The local image block (for example, the local image block shown in a lower left portion of FIG. 6B) including the object in the first image may be determined. The style of the first image is transformed according to a target style feature determined by the overall image style feature and the object style feature, so as to obtain a third image of a night style of the street.

Specifically, as shown in FIG. 6C, the overall image style feature of the first image, the object style feature of the local image block in the first image, the overall image style feature of the second image, and the object style feature of the local image block in the second image may be extracted through the feature extractor. Further, a background style feature of a background image block in the first image and a background style feature of a background image block in the second image may also be extracted.

Specifically, referring to FIG. 6C, in one aspect, the content feature of the first image may be obtained through the feature extractor. In an example, downsampling processing may be performed on the first image to obtain a feature map of the first image, and the content feature of the feature map is extracted. The extracted content feature may include the content feature of the overall image of the first image and the object content feature of the local image block, including the object, in the first image.

In the other aspect, the overall image style feature of the second image, the background style feature of the background image block in the second image, and the object style feature of the local image block, including the object, in the second image may be respectively extracted through the feature extractor. In an example, downsampling processing may be performed on the second image. The above-mentioned overall image style feature, the background style feature, and the object style feature are extracted from the second image subjected to the downsampling processing. The overall image style feature, the object style feature, and the background style feature are fused to determine the target style feature.

Exemplarily, the overall image style feature is fused into the background style feature. The background style feature into which the overall image style feature has been fused is fused into the object style feature to obtain the target style feature.

Further, a third image may be generated according to the content feature of the overall image of the first image and/or the object content feature of the local image block, including the object, in the first image, and the above-mentioned target style feature. In a possible implementation, the third image may be generated through the trained image generator.

Exemplarily, residual connection processing may be performed on the content feature of the overall image of the first image and the target style feature to obtain feature information having the content feature of the overall image of the first image and the target style feature, and/or residual connection processing may be performed on the object content feature of the local image block including the object in the first image and the target style feature to obtain the feature information having the object content feature of each local image block in the first image and the target style feature. Further, upsampling processing may be performed on the obtained feature information to obtain an image with the content corresponding to the content feature of the overall image of the first image and the style corresponding to the target style feature, and/or obtain a local image block with the content corresponding to the object content feature of each local image block in the first image and the style corresponding to the target style feature.

In some possible implementations, the overall image style feature of the first image may also be fused to the object style feature of the first image to obtain a fusion style feature of the first image, or the overall image style feature of the first image may also be fused to the background style feature of the first image and then the background style feature into which the overall image style feature has been fused to the object style feature of the first image to obtain a fusion style feature of the first image. An implementation of the fusion style feature of the first image may refer to an implementation of the target style feature in the previously described embodiments specifically, which is not described in detail herein.

Further, residual connection processing may be performed on the content feature of the overall image of the first image and the fusion style feature of the first image to obtain feature information having the content feature of the overall image of the first image and the fusion style feature of the first image, and/or residual connection processing may be performed on the object content feature of the local image block including the object in the first image and the fusion style feature of the first image to obtain the feature information having the object content feature of each local image block in the first image and the fusion style feature of the first image. Further, upsampling processing may be performed on the obtained feature information to obtain an image with the content corresponding to the content feature of the overall image of the first image and the style corresponding to the fusion style feature of the first image, and/or obtain a local image block with the content corresponding to the object content feature of each local image block in the first image and the style corresponding to the fusion style feature of the first image. The generated image should be completely consistent with the first image. The generated local image block should be completely consistent with the local image block of the first image.

Figure 7:
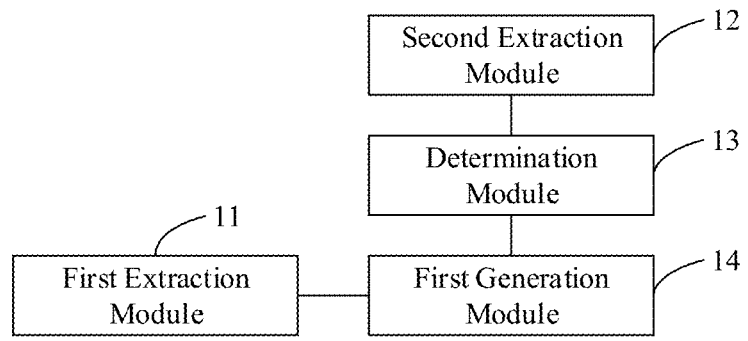
FIG. 7 shows a first block diagram of an image generation apparatus according to the embodiments of the disclosure.

FIG. 7 shows a first block diagram of an image generation apparatus according to the embodiments of the disclosure. As shown in FIG. 7, the apparatus includes a first extraction module 11, a second extraction module 12, a determination module 13, and a first generation module 14.

The first extraction module 11 is configured to extract a content feature of a first image.

The second extraction module 12 is configured to extract an overall image style feature of a second image and an object style feature of a local image block, including an object, in the second image respectively. A style of the second image is different from that of the first image.

The determination module 13 is configured to determine a target style feature at least according to the overall image style feature and the object style feature.

The first generation module 14, is configured to generate a third image according to the content feature and the target style feature, so that the third image has a content corresponding to the content feature and a style corresponding to the target style feature.

In a possible implementation manner, the determination module 13 is configured to fuse the overall image style feature into the object style feature to obtain the target style feature.

Figure 8:
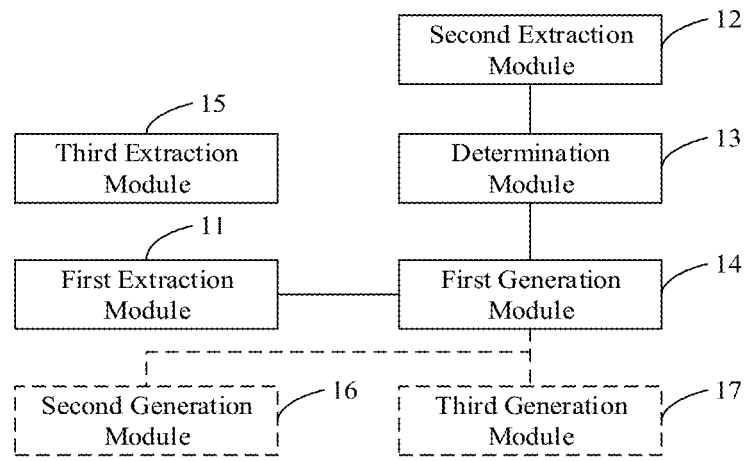
FIG. 8 shows a second block diagram of an image generation apparatus according to the embodiments of the disclosure.

FIG. 8 shows a second block diagram of an image generation apparatus according to the embodiments of the disclosure. As shown in FIG. 8, the apparatus further includes a third extraction module 15.

The third extraction module 15 is configured to extract a background style feature of a background image block in a second image. The background image block is an image block other than the local image block in the second image.

The determination module 13 is configured to determine a target style feature according to the overall image style feature, the object style feature, and the background style feature.

In a possible implementation manner, the determination module 13 is configured to fuse the overall image style feature into the background style feature, and fuse the background style feature into which the overall image style feature has been fused into the object style feature to obtain the target style feature.

In a possible implementation manner, the first generation module 14 is configured to: generate, via an image generator, an image according to the content feature and the target style feature; discriminate, via an image discriminator, a realness of the generated image; train the image generator on the basis of a confrontation between a discrimination result of the image discriminator and the image generated by the image generator; and generate, via the trained image generator, the third image.

In a possible implementation, the apparatus further includes a second generation module 16.

The first extraction module 11 is configured to extract a content feature of a source image.

The second generation module 16 is configured to input the content feature of the source image and the target style feature into a trained image generator to obtain a first target image. The first target image has a content corresponding to the content feature of the source image and a style corresponding to the target style feature.

In a possible implementation manner, the first image and/or the second image includes at least one object with at least one of the following categories: motor vehicles, non-motor vehicles, persons, traffic signs, traffic lights, trees, animals, buildings, or obstacles.

In a possible implementation manner, the second extraction module 12 is configured to, when the second image includes a plurality of objects, extract a plurality of local image blocks from the second image. Each local image block includes one object. The object style feature of each of the local image blocks are extracted respectively.

In a possible implementation manner, the second extraction module 12 is configured to, when the plurality of objects belong to a plurality of categories, fuse object style features extracted from a plurality of local image blocks including objects with the same category.

In a possible implementation, the apparatus further includes a third generation module 17.

The first extraction module 11 is configured to extract a content feature of a source image.

The third generation module 17 is configured to input the content feature of the source image, the target style feature, and random noise into the trained image generator to obtain a second target image. The second target image has a content corresponding to the content feature of the source image and the second target image has a style corresponding to the target style feature, or the second target image has a content corresponding to the content feature of the source image and the random noise and the second target image has a style corresponding to the target style feature, or the second target image has a content corresponding to the content feature of the source image and the second target image has a style corresponding to the target style feature and the random noise, or the second target image has a content corresponding to the content feature of the source image and the random noise and the second target image has a style corresponding to the target style feature and the random noise, or the second target image has a content corresponding to the content feature of the source image and the second target image has a style corresponding to the style noise, or the second target image has a content corresponding to the content feature of the source image and the random noise and the second target image has a style corresponding to the random noise.

It can be understood that each method embodiment and apparatus embodiment mentioned in the disclosure may be combined to form combined embodiments without departing from principles and logics. For shorting the textual length, elaborations are omitted in the disclosure.

In addition, the embodiments of the disclosure further provide an image generation apparatus, an electronic device, a computer-readable storage medium, and a program. All of the above can be used to implement any method provided by the disclosure. Corresponding technical solutions, description, and the corresponding records referring to a method part will not be described in detail.

It can be understood by those skilled in the art that, in the above-mentioned method of the specific implementations, the shown sequence of each step does not mean a strict execution sequence and is not intended to form any limitation to the implementation process and a specific execution sequence of each step should be determined by functions and probable internal logic thereof.

In some embodiments, the functions or modules of the apparatus provided by the embodiments of the disclosure can be used to execute the method described in the above method embodiments, and its specific implementation may refer to the description of the above method embodiment. For simplicity, it will not be repeated here.

The embodiments of the disclosure further provide a computer-readable storage medium, which stores a computer program instruction. The above-mentioned method of the embodiments of the disclosure is implemented when the computer program instruction is executed by a processor. The computer-readable storage medium may be a nonvolatile computer readable storage medium.

The embodiments of the disclosure further provide an electronic device, including a processor, and a memory, configured to store a processor executable instruction. The processor is configured to implement the above-mentioned method of the embodiments of the disclosure. The electronic device may be provided as a terminal, a server, or other forms of devices.

Figure 9:
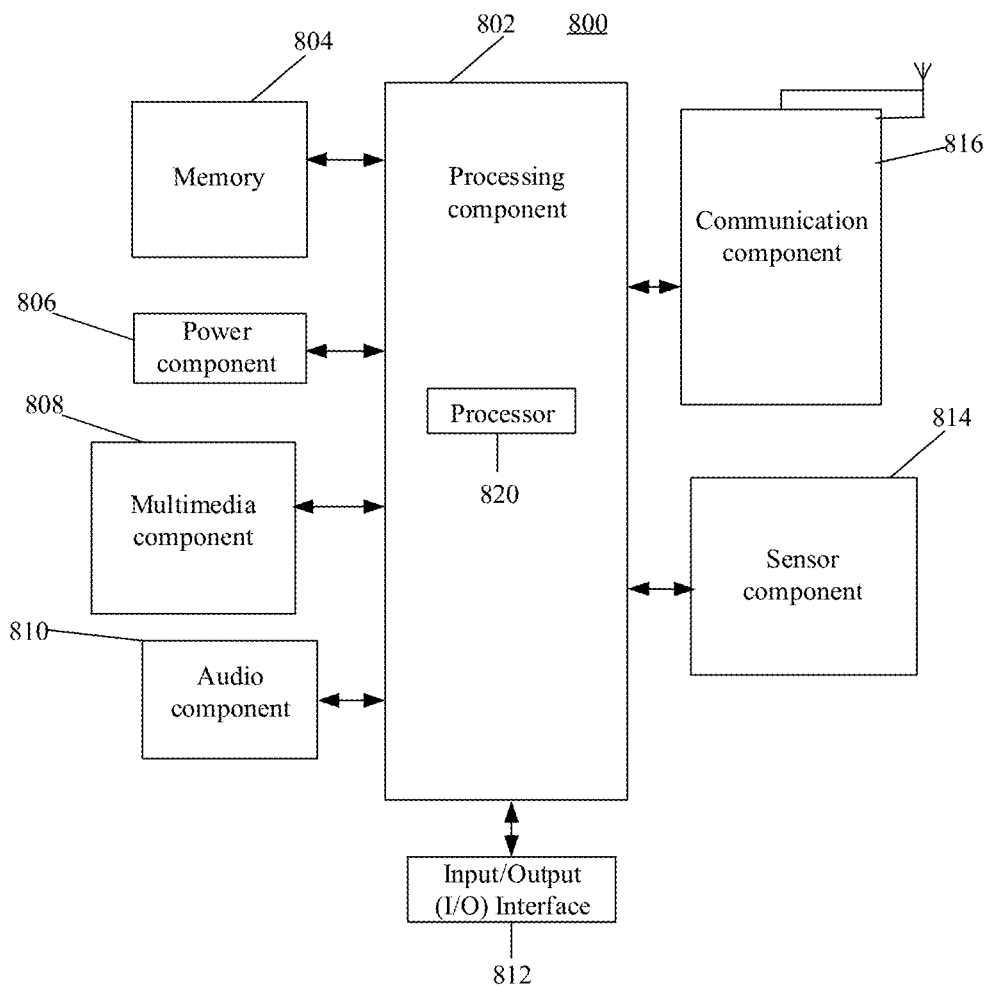
FIG. 9 is a first schematic structural diagram of an electronic device according to the embodiments of the disclosure.

FIG. 9 is a schematic structural diagram of an electronic device according to an exemplary embodiment. For example, the electronic device 800 may be a mobile phone, a computer, a digital broadcast terminal, a message receiving and transmitting device, a gaming console, a tablet device, a medical device, fitness equipment, a personal digital assistant, or the like.

Referring to FIG. 9, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls an overall operation of the electronic device 800, such as the operations associated with displays, telephone calls, data communications, camera operations, and recording operations. The processing component 802 may include one or more processors 820 to execute instructions to perform all or part of the steps in the above-mentioned method. Moreover, the processing component 802 may include one or more modules which facilitate interaction between the processing component 802 and the other components. For example, the processing component 802 may include a multimedia module to facilitate interaction between the multimedia component 808 and the processing component 802.

The memory 804 is configured to store various types of data to support the operation of the electronic device 800. Examples of such data include instructions for any Apps or methods operated on the electronic device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic disk or a compact disk.

The power component 806 provides power for various components of the electronic device 800. The power component 806 may include a power management system, one or more power supplies, and other components associated with generation, management and distribution of power for the electronic device 800.

The multimedia component 808 includes a screen providing an output interface between the electronic device 800 and a user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes, and gestures on the TP. The touch sensors may not only sense a boundary of a touch or swipe action but also detect a duration and pressure associated with the touch or swipe action. In some embodiments, the multimedia component 808 includes a front camera and/or a rear camera. A front camera and/or a rear camera may receive external multimedia data when the electronic device 800 is in an operation mode, for example, a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC). The MIC is configured to receive an external audio signal when the electronic device 800 is in the operation mode, such as a call mode, a recording mode, and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module. The above-mentioned peripheral interface module may be a keyboard, a click wheel, a button, etc. The button may include, but is not limited to: a home button, a volume button, a starting button, and a locking button.

The sensor component 814 includes one or more sensors configured to provide state assessment in various aspects for the electronic device 800. For example, the sensor component 814 may detect an on/off state of the electronic device 800 and relative positioning of components. For example, the components are a display and a small keyboard of the electronic device 800. The sensor component 814 may also detect a change in a position of the electronic device 800 or a component of the electronic device 800, presence or absence of contact between the user and the electronic device 800, orientation or acceleration/deceleration of the electronic device 800 and a change in temperature of the electronic device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some embodiments, the sensor component 814 may also include an acceleration sensor, a gyroscope sensor, a magnetic sensor, a pressure sensor or a temperature sensor.

The communication component 816 is configured to facilitate wired or wireless communication between the electronic device 800 and another device. The electronic device 800 may access a communication-standard-based wireless network, such as a Wireless Fidelity (Wi-Fi) network, a 2nd-Generation (2G), 3rd-Generation (3G), 4G, 5G or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-Wide Band (UWB) technology, a Bluetooth™ (BT) technology and another technology.

In the exemplary embodiment, the electronic device 800 may be implemented by one or more Application Specific Integrated Circuit (ASICs), Digital Signal Processor (DSPs), Digital Signal Processing Device (DSPDs), Programmable Logic Devices (PLDs), Field-Programmable Gate Arrays (FPGAs), controllers, micro-controllers, microprocessors or other electronic elements, and is configured to execute the above-mentioned method.

In the exemplary embodiment, a nonvolatile computer-readable storage medium is also provided, for example, a memory 804 including a computer program instruction. The computer program instruction may be executed by a processor 820 of an electronic device 800 to implement the above-mentioned method.

Figure 10:
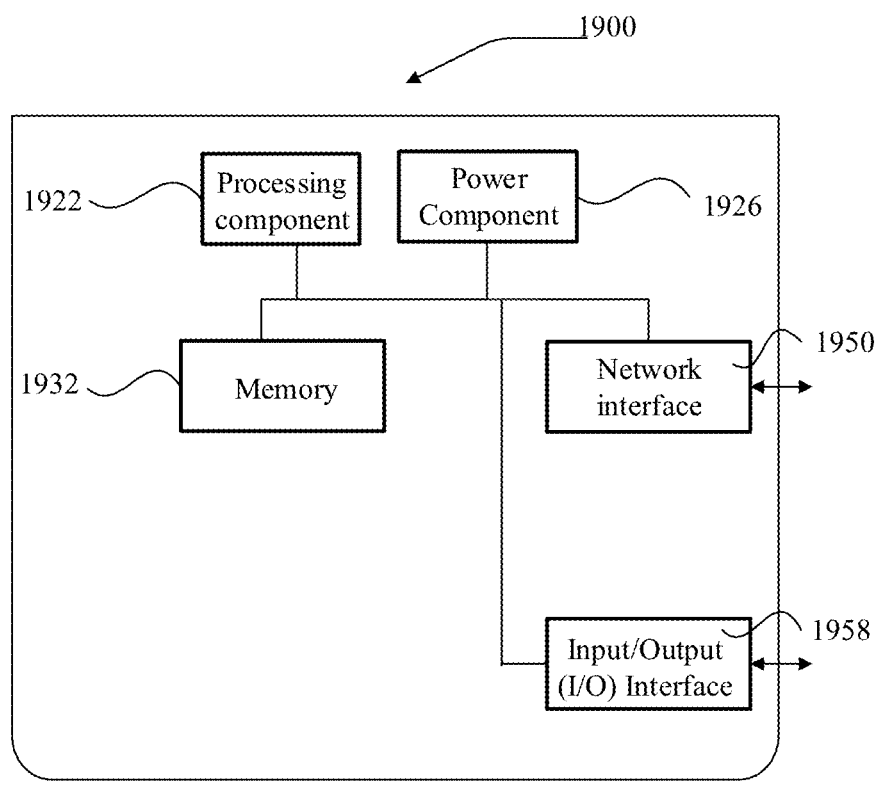
FIG. 10 is a second schematic structural diagram of the electronic device according to the embodiments of the disclosure.

FIG. 10 is a schematic structural diagram of an electronic device according to an exemplary embodiment. For example, the electronic device 1900 may be provided as a server. Referring to FIG. 10, the electronic device 1900 includes a processing component 1922, which further includes one or more processors, and a memory resource represented by a memory 1932, configured to store an instruction executable by the processing component 1922, for example, an APP. The APP stored in the memory 1932 may include one or more modules each of which corresponds to a set of instructions. In addition, the processing component 1922 is configured to execute instructions to execute the above-mentioned method.

The electronic device 1900 may further include a power component 1926 configured to execute power management of the electronic device 1900, a wired or wireless network interface 1950 configured to connect the electronic device 1900 to a network, and an I/O interface 1958. The electronic device 1900 may operate an operating system stored in the memory 1932, for example, Windows Server™, Mac OS X™, Unix™, Linux™, FreeBSD™ or the like.

The embodiments of the disclosure further provide a non-volatile computer readable storage medium, for example, a memory 1932 including a computer program instruction. The above-mentioned computer program instruction is executed by the processing component 1922 of the electronic device 1900, so as to complete the above-mentioned method.

The embodiments of the disclosure may be systems, methods, and/or computer program products. The computer program products may include a computer-readable storage medium, in which a computer-readable program instruction configured to enable a processor to implement each aspect of the disclosure is carried.

The computer-readable storage medium may be a physical device capable of retaining and storing an instruction used by an instruction execution device. For example, the computer-readable storage medium may be, but not limited to, an electric storage device, a magnetic storage device, an optical storage device, an electromagnetic storage device, a semiconductor storage device, or any appropriate combination thereof. More specific examples (non-exhaustive list) of the computer-readable storage medium include a portable computer disk, a hard disk, a RAM, a ROM, an EPROM (or a flash memory), an SRAM, a Compact Disc Read-Only Memory (CD-ROM), a Digital Video Disk (DVD), a memory stick, a floppy disk, a mechanical encoding device, for example, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be connected to the computer of the user through any type of network including an LAN or a WAN, or may be connected to an external computer (for example, connected by an Internet service provider through the Internet). In some embodiments, an electronic circuit such as a programmable logic circuit, an FPGA, or a Programmable Logic Array (PLA) may be customized by use of state personal information of a computer-readable program instruction, and the electronic circuit may execute the computer-readable program instruction, thereby implementing each aspect of the disclosure.

Herein, each aspect of the disclosure is described with reference to flowcharts and/or block diagrams of the method, device (system) and computer program product according to the embodiments of the disclosure. It is to be understood that each block in the flowcharts and/or the block diagrams and a combination of various blocks in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing various aspects of the function/action specified in one or more blocks in the flowcharts and/or the block diagrams.

These computer program instructions can also be loaded to a computer, another programmable data processing device or other devices, so that a series of operating steps are performed on the computer, the another programmable data processing device or other devices to produce a computer-implemented process, and therefore instructions executed on the computer, the another programmable data processing device or other devices may implement the function/action specified in one or more blocks in the flowcharts and/or the block diagrams.

The flowcharts and block diagrams in the drawings illustrate probably implemented system architectures, functions and operations of the system, method, and computer program product according to multiple embodiments of the disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed substantially concurrently and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

Each embodiment of the disclosure has been described above. The above descriptions are exemplary, non-exhaustive and also not limited to each disclosed embodiment. Many modifications and variations are apparent to those of ordinary skill in the art without departing from the scope and spirit of each described embodiment of the disclosure. The terms used herein are selected to explain the principle and practical application of each embodiment or improvements in the technologies in the market best or enable others of ordinary skill in the art to understand each embodiment disclosed herein.

What is claimed is:

1. An image generation method, comprising:
    extracting a content feature of a first image;
    respectively extracting an overall image style feature of a second image and an object style feature of a local image block, including an object, in the second image, wherein a style of the second image is different from that of the first image;
    determining a target style feature at least according to the overall image style feature and the object style feature; and
    generating a third image according to the content feature and the target style feature, so that the third image has a content corresponding to the content feature and a style corresponding to the target style feature.

2. The method of claim 1, wherein the determining the target style feature at least according to the overall image style feature and the object style feature comprises:
    fusing the overall image style feature into the object style feature to obtain the target style feature.

3. The method of claim 1, further comprising: extracting a background style feature of a background image block in the second image, wherein the background image block is an image block other than the local image block in the second image;
    the determining the target style feature at least according to the overall image style feature and the object style feature comprises: determining the target style feature according to the overall image style feature, the object style feature, and the background style feature.

4. The method of claim 3, wherein the determining the target style feature according to the overall image style feature, the object style feature, and the background style feature comprises:
    fusing the overall image style feature into the background style feature; and
    fusing the background style feature into which the overall image style feature has been fused into the object style feature to obtain the target style feature.

5. The method of claim 1, wherein the generating the third image according to the content feature and the target style feature, so that the third image has the content corresponding to the content feature and the style corresponding to the target style feature comprises:
    generating, via an image generator, an image according to the content feature and the target style feature, and discriminating, via an image discriminator, a realness of the generated image;
    training the image generator on the basis of a confrontation between a discrimination result of the image discriminator and the image generated by the image generator; and
    generating, via the trained image generator, the third image.

6. The method of claim 5, further comprising:
    extracting a content feature of a source image; and
    inputting the content feature of the source image and the target style feature into the trained image generator to obtain a first target image, wherein the first target image has a content corresponding to the content feature of the source image and a style corresponding to the target style feature.

7. The method of claim 1, wherein the first image and/or the second image comprises at least one object with at least one of the following categories: motor vehicles, non-motor vehicles, persons, traffic signs, traffic lights, trees, animals, buildings, or obstacles.

8. The method of claim 1, wherein when the second image comprises a plurality of objects, the extracting the object style feature of a local image block including an object in the second image comprises:
- extract a plurality of local image blocks from the second image, wherein each local image block comprises one object; and
- respectively extracting an object style feature of each of the local image blocks.

9. The method of claim 8, wherein when the plurality of objects belong to a plurality of categories, the extracting the object style feature of a local image block, including an object, in the second image further comprises:
- fusing object style features extracted from a plurality of local image blocks including objects with the same category.

10. The method of claim 5, further comprising:
- extracting a content feature of a source image; and
- inputting the content feature of the source image, the target style feature, and random noise into the trained image generator to obtain a second target image, wherein the second target image has a content corresponding to the content feature of the source image and the second target image has a style corresponding to the target style feature, or the second target image has a content corresponding to the content feature of the source image and the random noise and the second target image has a style corresponding to the target style feature, or the second target image has a content corresponding to the content feature of the source image and the second target image has a style corresponding to the target style feature and the random noise, or the second target image has a content corresponding to the content feature of the source image and the random noise and the second target image has a style corresponding to the target style feature and the random noise, or the second target image has a content corresponding to the content feature of the source image and the second target image has a style corresponding to the style noise, or the second target image has a content corresponding to the content feature of the source image and the random noise and the second target image has a style corresponding to the random noise.

11. An electronic device, comprising:
- a processor, and
- a memory, configured to store a processor executable instruction,
- wherein the processor is configured to execute the processor executable instruction to cause the electronic device to perform the following operations comprising:
- extracting a content feature of a first image;
- extracting an overall image style feature of a second image and an object style feature of a local image block, including an object, in the second image respectively, wherein a style of the second image is different from that of the first image;
- determining a target style feature at least according to the overall image style feature and the object style feature; and
- generating a third image according to the content feature and the target style feature, so that the third image has a content corresponding to the content feature and a style corresponding to the target style feature.

12. The electronic device of claim 11, wherein the processor is further configured to execute the processor executable instruction to cause the electronic device to fuse the overall image style feature into the object style feature to obtain the target style feature.

13. The electronic device of claim 11, wherein the processor is further configured to execute the processor executable instruction to cause the electronic device to:
- extract a background style feature of a background image block in the second image, wherein the background image block is an image block other than the local image block in the second image; and
- determine the target style feature according to the overall image style feature, the object style feature, and the background style feature.

14. The electronic device of claim 13, wherein the processor is further configured to execute the processor executable instruction to cause the electronic device to fuse the overall image style feature into the background style feature, and fuse the background style feature into which the overall image style feature has been fused into the object style feature to obtain the target style feature.

15. The electronic device of claim 11, wherein the processor is further configured to execute the processor executable instruction to cause the electronic device to:
- generate, via an image generator, an image according to the content feature and the target style feature;
- discriminate, via an image discriminator, a realness of the generated image;
- train the image generator on the basis of a confrontation between a discrimination result of the image discriminator and the image generated by the image generator; and
- generate, via the trained image generator, the third image.

16. The electronic device of claim 15, wherein the processor is further configured to execute the processor executable instruction to cause the electronic device to:
- extract a content feature of a source image; and
- input the content feature of the source image and the target style feature into the trained image generator to obtain a first target image, wherein the first target image has a content corresponding to the content feature of the source image and a style corresponding to the target style feature.

17. The electronic device of claim 11, wherein the processor is further configured to execute the processor executable instruction to cause the electronic device to:
- extract a plurality of local image blocks from the second image when the second image comprises a plurality of objects, wherein each local image block comprises one object, and
- extract an object style feature of each of the local image blocks respectively.

18. The electronic device of claim 17, wherein the processor is further configured to execute the processor executable instruction to cause the electronic device to, when the plurality of objects belong to a plurality of categories, fuse object style features extracted from a plurality of local image blocks including objects with the same category.

19. The electronic device of claim 15, wherein the processor is further configured to execute the processor executable instruction to cause the electronic device to:
- extract a content feature of a source image; and
- input the content feature of the source image, the target style feature, and random noise into the trained image generator to obtain a second target image, wherein the second target image has a content corresponding to the content feature of the source image and the second target image has a style corresponding to the target style feature, or the second target image has a content corresponding to the content feature of the source image and the random noise and the second target image has a style corresponding to the target style feature, or the second target image has a content corresponding to the content feature of the source image and the second target image has a style corresponding to the target style feature and the random noise, or the second target image has a content corresponding to the content feature of the source image and the random noise and the second target image has a style corresponding to the target style feature and the random noise, or the second target image has a content corresponding to the content feature of the source image and the second target image has a style corresponding to the style noise, or the second target image has a content corresponding to the content feature of the source image and the random noise and the second target image has a style corresponding to the random noise.

20. A non-transitory computer-readable storage medium, storing a computer program instruction thereon, wherein the computer program instruction, when being executed by a processor, causes the processor to perform an image generation method comprising:

extracting a content feature of a first image;

respectively extracting an overall image style feature of a second image and an object style feature of a local image block, including an object, in the second image, wherein a style of the second image is different from that of the first image;

determining a target style feature at least according to the overall image style feature and the object style feature; and generating a third image according to the content feature and the target style feature, so that the third image has a content corresponding to the content feature and a style corresponding to the target style feature.

* * * * *